(12) United States Patent
Chen et al.

(10) Patent No.: US 11,600,822 B2
(45) Date of Patent: Mar. 7, 2023

(54) COORDINATION-POLYMER CATHODE MATERIAL AND FABRICATING METHOD THEREOF, AND LITHIUM-ION BATTERY

(71) Applicant: NATIONAL CHENG KUNG UNIVERSITY, Tainan (TW)

(72) Inventors: Teng-hao Chen, Tainan (TW); Kaveevivitchai Watchareeya, Tainan (TW); An-che Li, Tainan (TW); Cheng-han Chang, Tainan (TW)

( * ) Notice: Subject to any disclaimer, the term of this patent is extended or adjusted under 35 U.S.C. 154(b) by 193 days.

(21) Appl. No.: 17/233,486

(22) Filed: Apr. 18, 2021

(65) Prior Publication Data
US 2022/0199999 A1    Jun. 23, 2022

(30) Foreign Application Priority Data
Dec. 21, 2020    (TW) ................................ 109145371

(51) Int. Cl.
| | |
|---|---|
| H01M 4/60 | (2006.01) |
| H01M 10/0525 | (2010.01) |
| H01M 4/04 | (2006.01) |
| H01M 10/0569 | (2010.01) |
| H01M 10/0568 | (2010.01) |
| H01M 4/38 | (2006.01) |
| H01M 4/485 | (2010.01) |
| H01M 4/583 | (2010.01) |

(52) U.S. Cl.
CPC ........... *H01M 4/60* (2013.01); *H01M 4/0402* (2013.01); *H01M 4/382* (2013.01); *H01M 4/485* (2013.01); *H01M 4/583* (2013.01); *H01M 10/0525* (2013.01); *H01M 10/0568* (2013.01); *H01M 10/0569* (2013.01)

(58) Field of Classification Search
None
See application file for complete search history.

(56) References Cited

PUBLICATIONS

Li et al. "Superior performance enabled by supramolecular interactions in metal-organic cathode: the power of weak bonds" Journal of Materials Chemistry A, Royal Society of Chemistry. Apr. 15, 2022. p. 19671-19679. (Year: 2022).*
Cheng-Han Chang et al., "Elucidating Metal and Ligand Redox Activities of Copper-Benzoquinoid Coordination Polymer as Cathode for Lithium-Ion Batteries",Journal of Materials Chemistry A,vol. 7,Aug. 9, 2019,pp. 23770 to 23774.

* cited by examiner

*Primary Examiner* — Christopher P Domone

(57) ABSTRACT

A cathode material and a fabricating method thereof, and a lithium-ion battery are described. The cathode material is a 1D metal-organic coordination polymer of $[CuL(Py)_2]_n$, and its structure is formed by interlinking organic ligands (L) and metals (Cu). The cathode material can use redox active sites on both the metal and organic ligand to carry out multi-electron transfer. A C≡N bond contained in L together with a benzene ring of L in an adjacent polymer chain form a weak interaction of C≡N . . . π. In addition, a Py of adjacent polymer chains also have an interaction of π . . . π. Therefore, $[CuL(Py)_2]_n$ chains are closely interlaced and packed, but there is still enough regular space for lithium ions to enter and exit quickly, so it can be charged and discharged rapidly and exhibits high power density.

10 Claims, 8 Drawing Sheets

COORDINATION-POLYMER CATHODE MATERIAL AND FABRICATING METHOD THEREOF, AND LITHIUM-ION BATTERY

CROSS REFERENCE TO RELATED APPLICATION

This application claims priority to Taiwan Patent Application No. 109145371, filed on Dec. 21, 2020, which is incorporated herein by reference in its entirety.

FIELD OF DISCLOSURE

The present disclosure relates to batteries, and more particularly to a cathode material and a fabricating method thereof, and a lithium-ion battery.

BACKGROUND OF DISCLOSURE

In recent years, lithium-ion batteries have been widely used in various electronic products, electric vehicles, or energy storage devices. Therefore, many researches are focused on improving an efficiency, an energy density and safety of lithium-ion batteries. However, existing lithium-ion batteries have insufficient capacity at low current density (for example, 20 mA/g) or at high current density (for example, 1000 mA/g). Therefore, both the capacity and charge/discharge rate capability need to be improved.

Therefore, it is necessary to provide a cathode material and a fabricating method thereof, and a lithium-ion battery to solve problems of conventional technologies.

SUMMARY OF DISCLOSURE

An object of the present disclosure is to provide a cathode material of $[CuL(Py)_2]_n$, which is suitable for a lithium-ion battery. The cathode material is a 1D (one-dimensional) metal-organic coordination polymer of $[CuL(Py)_2]_n$, and its structure is formed by interlinking organic ligands (L) and metals (Cu). The cathode material can use redox active sites on both the metal and organic ligand to carry out multi-electron transfer. A C≡N bond contained in L and a benzene ring of L in an adjacent polymer chain form a weak interaction of C≡N . . . π. In addition, pyridine (Py) molecules on adjacent polymer chains also have an interaction of π. . . π. Therefore, $[CuL(Py)_2]_n$ 1D chains are closely interlaced and orderly packed. However, there is still enough space for lithium ions to enter and exit quickly, so it can be charged and discharged quickly and can exhibit high power density.

Another object of the present disclosure is to provide a fabricating method of a cathode material, which utilizes a specific composition (1,4-dicyano-2,3,5,6-tetrahydroxybenzene ($LH_4$), a copper salt, and pyridine (Py)) and specific steps to form the cathode material of an embodiment of the present disclosure.

A further object of the present disclosure is to provide a lithium-ion battery comprising a cathode material according to an embodiment of the present disclosure. The lithium-ion battery has a specific capacity reaching approximately 255 mAh/g at a current density of 65 mA/g and has a capacity reaching approximately 60 mAh/g at a current density of 26000 mA/g (that is, 26 A/g).

To achieve the above object, the present disclosure provides a cathode material, suitable for a lithium-ion battery, wherein the cathode material comprises following formula (1) of:

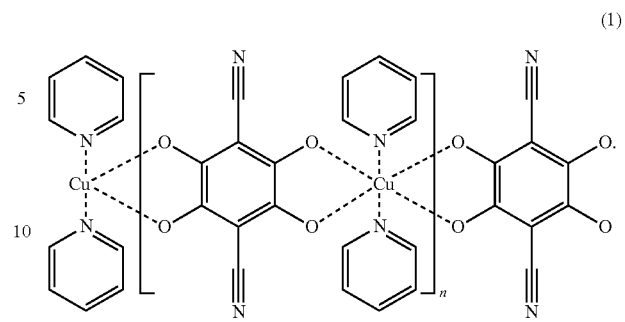

To achieve another object described above, the present disclosure provides a fabricating method of a cathode material, suitable for a lithium-ion battery, wherein the fabricating method comprises steps of: adding 1,4-dicyano-2,3,5,6-tetrahydroxybenzene and a copper salt in a solvent to form a first solution, wherein a molar ratio of 1,4-dicyano-2,3,5,6-tetrahydroxybenzene and the copper salt is between 0.5 and 2; adding pyridine to the first solution to form a second solution, and heating the second solution at 95-105° C. for 24 to 72 hours, wherein a volume ratio of pyridine to the solvent is between 0.1 and 2; and cooling and filtering the second solution to obtain the cathode material, wherein the cathode material includes a structural formula of following formula (1):

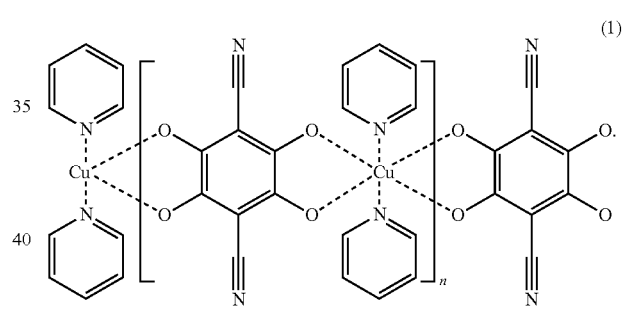

In an embodiment of the present disclosure, the solvent comprises at least one of N,N-dimethylformamide (DMF), N,N-diethylformamide (DEF), N,N-dimethylacetamide (DMA), dimethyl sulfoxide (DMSO), MeOH, EtOH, isopropanol, and water.

In an embodiment of the present disclosure, the copper salt comprises at least one of copper nitrate, copper sulfate, copper acetate, copper carbonate, copper phosphate, copper hypochlorite, copper chloride, copper hydroxide, copper fluoride, copper bromide, copper iodide, and hydrates thereof.

In an embodiment of the present disclosure, after cooling and filtering the second solution to obtain the cathode material, the fabricating method further comprises a step of: washing the cathode material sequentially with N,N-dimethylformamide and ethyl acetate, and drying the cathode material under vacuum for 2 to 4 hours.

To achieve a further object described above, the present disclosure provides a lithium-ion battery comprising: a cathode material according to any one embodiment described above, an anode material; and an electrolyte. The electrolyte is placed between the cathode material and the anode material.

In an embodiment of the present disclosure, the anode material comprises at least one of graphite, lithium titanium oxide, and lithium metal.

In an embodiment of the present disclosure, the electrolyte comprises a lithium salt, wherein the lithium salt comprises at least one of LiTFSI, LiFSI, LiPF$_6$, LiClO$_4$, LiBOB, and LiBF$_4$.

In an embodiment of the present disclosure, the electrolyte further comprises ethylene carbonate (EC) and dimethyl carbonate (DMC), wherein a volume ratio of ethylene carbonate (EC) and dimethyl carbonate (DMC) is between 0.5 and 2.

In an embodiment of the present disclosure, the electrolyte further comprises ethylene carbonate (EC) and diethyl carbonate (DEC), wherein a volume ratio of ethylene carbonate (EC) and diethyl carbonate (DEC) is between 0.5 and 2.

DETAILED DESCRIPTION OF PREFERRED EMBODIMENTS

Figure 1:
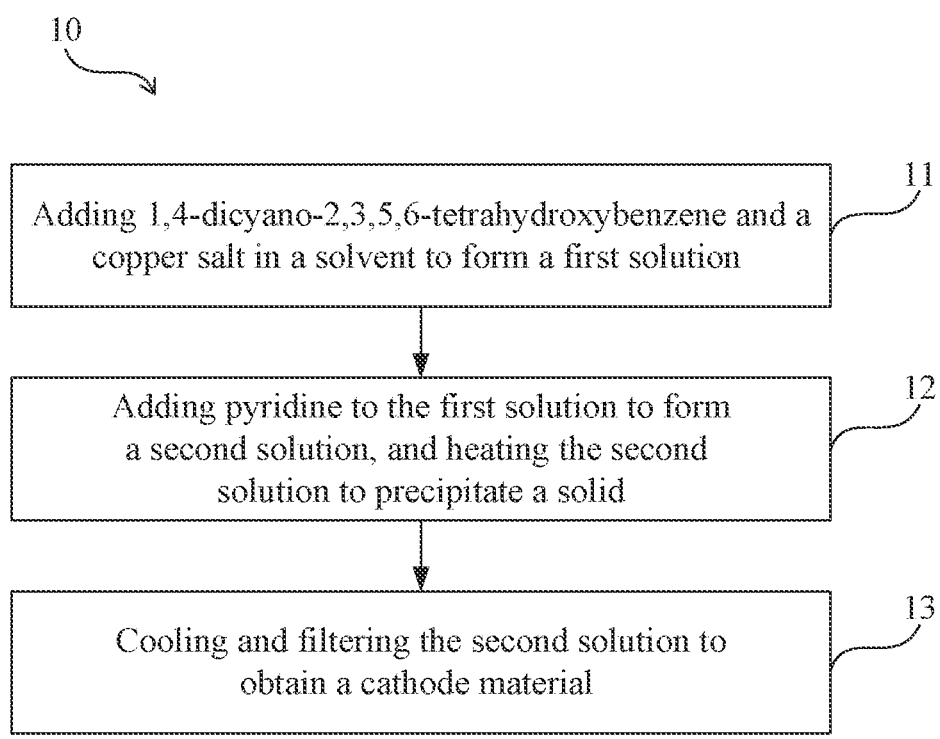
FIG. 1 is a schematic flowchart of a fabricating method of a cathode material according to an embodiment of the present disclosure.

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

An embodiment of the present disclosure provides a cathode material suitable for a lithium-ion battery. The cathode material comprises following formula (1) of:

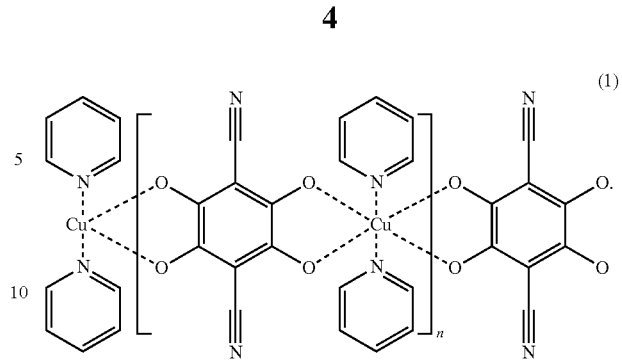

(1)

In the present disclosure, a structural formula of the above formula (1) can be referred to as [CuL(Py)$_2$]$_n$, where L is derived from 1,4-dicyano-2,3,5,6-tetrahydroxybenzene (LH$_4$); Py is pyridine; and Cu is derived from a copper salt. In one embodiment, the copper salt comprises at least one of copper nitrate, copper sulfate, copper acetate, copper carbonate, copper phosphate, copper hypochlorite, copper chloride, copper hydroxide, copper fluoride, copper bromide, copper iodide, and hydrates thereof.

It is noted that, the cathode material is a 1D (one-dimensional) metal-organic coordination polymer of [CuL(Py)$_2$]$_n$, and its structure is formed by interlinking organic ligands (L) and metals (Cu). The cathode material can use redox active sites on both the metal and organic ligand to carry out multi-electron transfer. A C≡N bond contained in L and a benzene ring of L in an adjacent polymer chain form a weak interaction of C≡N . . . π. In addition, pyridine (Py) molecules on adjacent polymer chains also have an interaction of π . . . π. Therefore, [CuL(Py)$_2$]$_n$ 1D chains are closely interlaced and orderly packed. However, there is still enough space for lithium ions to enter and exit quickly, so it can be charged and discharged quickly and can exhibit high power density. For example, when the cathode material of an embodiment of the present disclosure is applied to a lithium-ion battery, a capacity at a current density of 65 mA/g can reach about 255 mAh/g, and a capacity at a current density of 26000 mA/g (i.e., 26 A/g) can reach approximately 60 mAh/g. In addition, a battery power density can reach 15,800 W/kg.

Further, it should be mentioned that number of the n value in formula (1) is not particularly limited, as long as a feasible n value in the polymer is within a protection scope of the present disclosure, for example, n is greater than 1000, or n is between 3000 and 50000, etc.

In addition, it should be mentioned that the cathode material of an embodiment of the present disclosure has a specific coordination structure. If one of structural components is changed (for example, replacing any of Cu, L, and Py with other groups or elements), the above effects cannot be achieved, especially the effect of high power density cannot be achieved.

Referring to FIG. 1, an embodiment of the present disclosure provides a fabricating method 10 of a cathode material, suitable for a lithium-ion battery. The fabricating method 10 comprises steps 11-13 of:

(step 11): adding 1,4-dicyano-2,3,5,6-tetrahydroxybenzene and a copper salt in a solvent to form a first solution, wherein a molar ratio of 1,4-dicyano-2,3,5,6-tetrahydroxybenzene and the copper salt is between 0.5 and 2;

(step 12): adding pyridine to the first solution to form a second solution, and heating the second solution at 95-105° C. for 24 to 72 hours, wherein a volume ratio of pyridine to the solvent is between 0.1 and 2; and (step 13): cooling and filtering the second solution to obtain the cathode material, wherein the cathode material includes a structural formula of following formula (1):

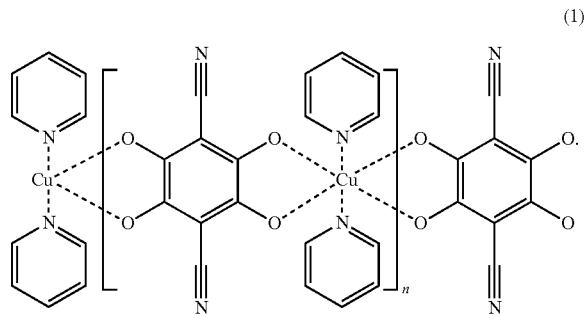

In the present disclosure, the implementation details and principles of the above-mentioned steps of the embodiments are described in detail below in sequence.

At first, the fabricating method 10 of a cathode material according to an embodiment of the present disclosure has a step 11 of: adding 1,4-dicyano-2,3,5,6-tetrahydroxybenzene and a copper salt in a solvent to form a first solution, wherein a molar ratio of 1,4-dicyano-2,3,5,6-tetrahydroxybenzene and the copper salt is between 0.5 and 2. In step 11, the molar ratio of 1,4-dicyano-2,3,5,6-tetrahydroxybenzene and the copper salt is such as 0.6, 0.7, 0.8, 1.0, 1.5, 1.7, or 1.9. In an embodiment, the solvent comprises at least one of N,N-dimethylformamide (DMF), N,N-diethylformamide (DEF), N,N-dimethylacetamide (DMA), dimethyl sulfoxide (DMSO), MeOH, EtOH, isopropanol, and water. In another embodiment, the copper salt comprises at least one of copper nitrate, copper sulfate, copper acetate, copper carbonate, copper phosphate, copper hypochlorite, copper chloride, copper hydroxide, copper fluoride, copper bromide, copper iodide, and hydrates thereof.

Then, the fabricating method 10 of a cathode material according to an embodiment of the present disclosure has a step 12 of: adding pyridine (Py) to the first solution to form a second solution, and heating the second solution at 95-105° C. for 24 to 72 hours, wherein a volume ratio of pyridine to the solvent is between 0.1 and 2. In step 12, an appropriate heating temperature is applied to react the first solution with pyridine, and heating the second solution to precipitate a solid. In one embodiment, a volume ratio of pyridine to the solvent is, for example, 0.2, 0.3, 0.5, 1.0, 1.5, 1.7, 1.8, or 1.9.

In an embodiment, considering the structural formula of the product (i.e., formula (1)), the molar ratio of pyridine to 1,4-dicyano-2,3,5,6-tetrahydroxybenzene (or the copper salt) can be about 2, but the molar ratio can also be between 1.5 and 2.5. In the case where the molar ratio is greater than 2.5 or less than 1.5, it is easy to cause cost waste due to excessive use of any one of pyridine and 1,4-dicyano-2,3, 5,6-tetrahydroxybenzene (or the copper salt). In another embodiment, the solvent can be a solvent that can dissolve pyridine, 1,4-dicyano-2,3,5,6-tetrahydroxybenzene, and copper salt, and the solvent does not have a negative impact on the prepared cathode material. In an example, a molar concentration of 1,4-dicyano-2,3,5,6-tetrahydroxybenzene and the solvent is, for example, between 0.005 and 0.15 M.

In an example, a molar concentration of the copper salt and the solvent is, for example, between 0.005 and 0.15 M. In an example, a molar concentration of the pyridine and the solvent is, for example, between 0.01 and 0.3 M.

Then, the fabricating method 10 of a cathode material according to an embodiment of the present disclosure has a step 13 of: cooling and filtering the second solution to obtain the cathode material, wherein the cathode material includes a structural formula of the above formula (1). In step 13, orange crystals (that is, the cathode material in the embodiment of the present disclosure) can be obtained by cooling (for example, cooling to room temperature, such as about 25° C.) and filtering through a filter (for example, a glass filter). In an embodiment, the cathode material can be washed sequentially with N,N-dimethylformamide (DMF) and ethyl acetate, and dried under vacuum for 2 to 4 hours (for example, about 3 hours) to obtain the cathode material.

It can be seen from the above that the fabricating method 10 of an embodiment of the present disclosure can be used to prepare the cathode material (i.e., formula (1)) of any one embodiment of the present disclosure described above. Further, the cathode material fabricated by the fabricating method 10 of any one embodiment of the present disclosure can have a similar effect as the cathode material of any one embodiment of the present disclosure, so it will not be repeated.

In addition, it should be mentioned that the present disclosure also provides a lithium-ion battery, which comprises a cathode material as described in any one of the above embodiments; an anode material; and an electrolyte, wherein the electrolyte is placed between the cathode material and the anode material.

In an embodiment, the anode material comprises at least one of graphite, lithium titanium oxide, and lithium metal. In another embodiment, the electrolyte comprises a lithium salt. In an example, the lithium salt comprises at least one of lithium bistrifluoromethylsulfonimide (LiTFSI), lithium bis (fluorosulfonyl)imide (LiFSI), lithium hexafluorophosphate (LiPF$_6$), lithium perchlorate (LiClO$_4$), lithium bis(oxalate) borate (LiBOB), and ithium tetrafluoroborate (LiBF$_4$). In a further embodiment, the electrolyte further comprises ethylene carbonate (EC) and dimethyl carbonate (DMC), wherein a volume ratio of ethylene carbonate (EC) and dimethyl carbonate (DMC) is between 0.5 and 2. For example, the volume ratio is 0.6, 0.7, 0.8, 1.0, 1.5, 1.7, or 1.9. In a further embodiment, the electrolyte further comprises ethylene carbonate (EC) and diethyl carbonate (DEC), wherein a volume ratio of ethylene carbonate (EC) and diethyl carbonate (DEC) is between 0.5 and 2. For example, the volume ratio is 0.6, 0.7, 0.8, 1.0, 1.5, 1.7, or 1.9.

In one embodiment, the present disclosure excludes the application of the cathode material to other components of the lithium-ion battery, such as anode material, electrolyte, or separator.

In an embodiment, the lithium-ion battery of the present disclosure uses a specific cathode material (i.e., formula (1)) and a specific concentration of electrolyte (for example, 1 M LiPF$_6$ is used as an electrolyte, which is dissolved in ethylene carbonate (EC) and dimethyl carbonate (DMC) with a volume ratio of about 1:1) to have the effect of high power density.

The following provides specific experimental data analysis to illustrate that the cathode material of an embodiment of the present disclosure has the above-mentioned effects.

Embodiment 1

1,4-dicyano-2,3,5,6-tetrahydroxybenzene (180 mg; 0.9 mmol) and copper nitrate hydrate (Cu(NO$_3$)$_2$·3H$_2$O (215 mg, 0.9 mmol) are dissolved in a solvent (N,N-dimethylformamide, 100 mL) and mixed with ultrasonic vibration to form a first solution. Then, pyridine is added to the first solution to form a second solution, and the second solution is heated at 95-105° C. for 24 to 72 hours (for example, 48 hours), wherein a volume ratio of pyridine to the solvent is between 0.1 and 2 (for example, the volume ratio is about 0.2). Afterwards, the second solution is cooled and filtered to obtain the cathode material ($[CuL(Py)_2]_n$) of orange crystals (for example, orange single crystals). After that, the cathode material is washed sequentially with N,N-dimethylformamide and ethyl acetate, and the cathode material is dried under vacuum for 2 to 4 hours (for example, about 3 hours).

Then, $[CuL(Py)_2]_n$ is ground and mixed with Ketjen black conductive carbon (Lion Specialty Chemicals Company; Japan) and polyvinylidene fluoride (PVDF) in a weight ratio of about 3:6:1 to form a mixture. Then, the mixture is stirred in N-methylpyrrolidone (NMP) and coated onto carbon paper used as a current collector, so as to serve as a cathode. The cathode is vacuum dried overnight at about 80~120° C. (such as about 100° C.).

Then, the above cathode is used as a cathode of a CR2032 coin cell, where the CR2032 coin cell is assembled by: using Li metal as anode; using 1 M $LiPF_6$ as an electrolyte, which is dissolved in ethylene carbonate (EC) and dimethyl carbonate (DMC) with a volume ratio of about 1:1; and using a commercial separator (Celgard Company) as a separator. Then, an analysis is performed with a cycler (Arbin company) and VMP3 system (BioLogic company), and analysis results are shown in FIGS. 2A to 2C.

Figure 2A:
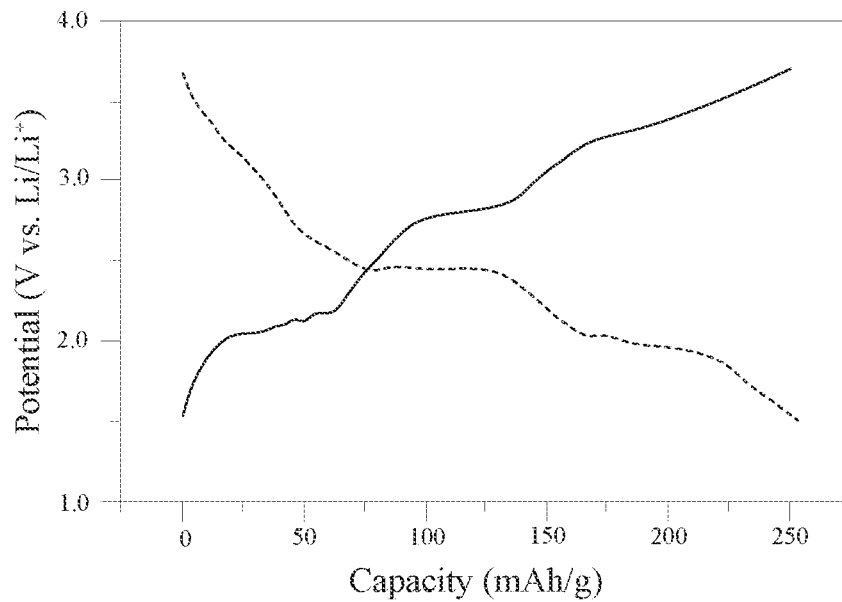
FIG. 2A is a diagram of a voltage profile of a [CuL(Py)$_2$]$_n$ electrode at a current density of 0.25C (about 65 mA/g), according to Embodiment 1.
Figure 2B:
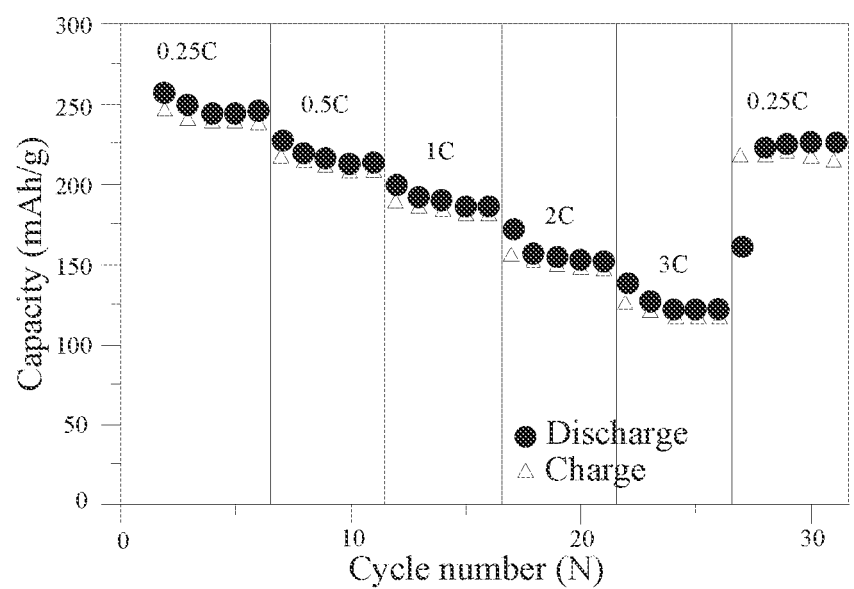
FIG. 2B is an analyzing diagram of rate capability of a [CuL(Py)$_2$]$_n$ electrode at different current densities, according to Embodiment 1.
Figure 2C:
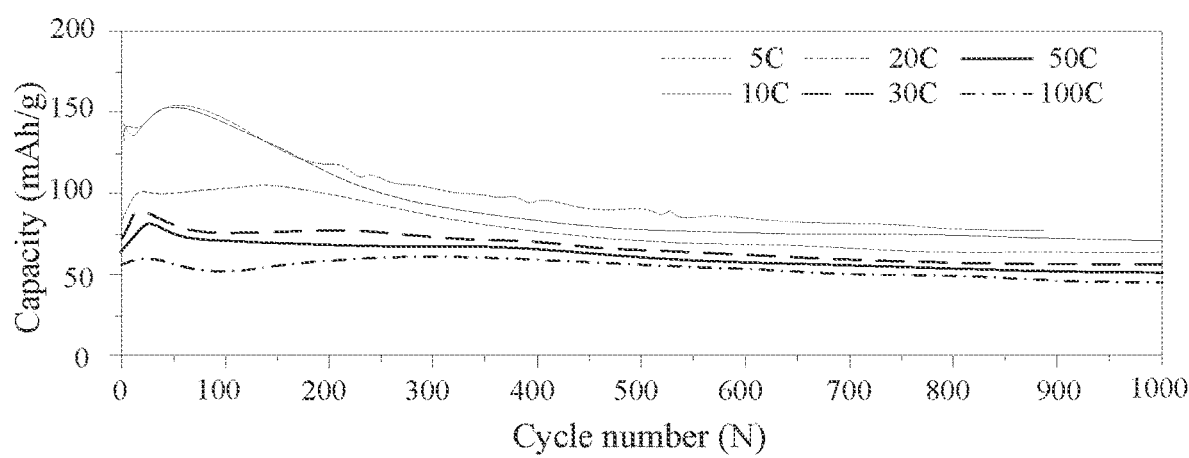
FIG. 2C is an analyzing diagram of capacity retention of a [CuL(Py)$_2$]$_n$ electrode at high rates from 5C (about 1.3 A/g) to 100C (about 26 A/g), according to Embodiment 1.

FIG. 2A to FIG. 2C relates to electrochemical properties of $[CuL(Py)_2]_n$. FIG. 2A is a diagram of a voltage profile of a $[CuL(Py)_2]_n$ electrode at a current density of 0.25C (about 65 mA/g), according to Embodiment 1. FIG. 2B is an analyzing diagram of rate capacity of a $[CuL(Py)_2]_n$ electrode at different current densities, according to Embodiment 1. FIG. 2C is an analyzing diagram of capacity retention of a $[CuL(Py)_2]_n$ electrode at high rates from 5C (about 1.3 A/g) to 100C (about 26 A/g), according to Embodiment 1.

From FIG. 2A to FIG. 2C, it can be seen that using $[CuL(Py)_2]_n$ as a cathode material can exhibit excellent charge and discharge results. For example, a capacity at a current density of 65 mA/g can reach about 255 mAh/g, and a capacity at a current density of 26000 mA/g (that is, 26 A/g) can reach about 60 mAh/g. In addition, the battery power density can reach 15800 W/kg. Even after 1000 charge and discharge cycles, $[CuL(Py)_2]_n$ can still maintain a good capacity retention and rate capability.

Embodiments 2-4

The production methods of Embodiments 2 to 4 are similar to that of Embodiment 1, but some of the components used are different. In Embodiment 2, $[CuL(Py)_2]_n$ (i.e., AM) is ground and mixed with Ketjen black conductive carbon (i.e., KB) (Lion Specialty Chemicals Company; Japan) and polyvinylidene fluoride (PVDF) in a weight ratio of about 5:4:1 to form a mixture, and other production steps and parameters are substantially the same as in Embodiment 1. In Embodiment 3, $[CuL(Py)_2]_n$ is ground and mixed with commercial carbon SP (TIMCAL company), conductive carbon KS4 (Imerys company), and polyvinylidene fluoride (PVDF) in a weight ratio of about 5:3:1:1 to form a mixture, and other production steps and parameters are substantially the same as in Embodiment 1. In Embodiment 4, 1 M $LiPF_6$ is used as an electrolyte, which is dissolved in ethylene carbonate (EC) and diethyl carbonate (DEC) with a volume ratio of about 1:1, and other production steps and parameters are substantially the same as in Embodiment 1.

Then, an analysis is performed with a cycler (Arbin company) and VMP3 system (BioLogic company) on each of Embodiments 2-4, and after that, the analysis results of Embodiment 1 and Embodiments 2-4 are combined, as shown in FIG. 2D to FIG. 2H.

Figure 2D:
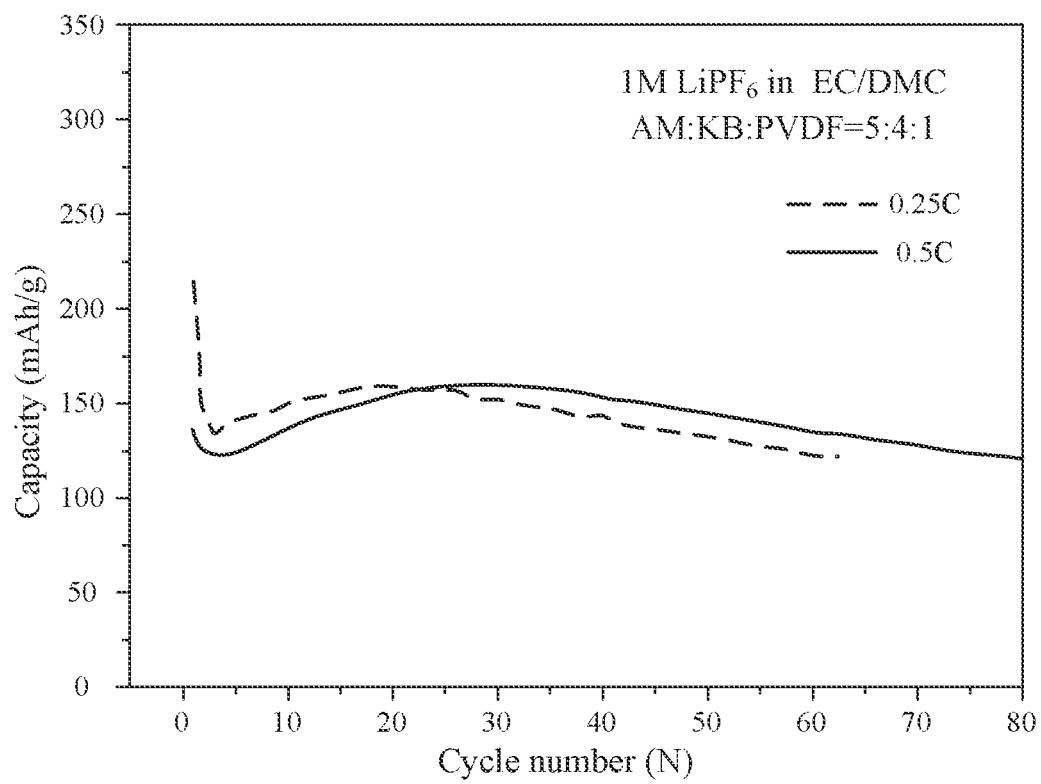
FIG. 2D is an analyzing diagram of capacity retention of a [CuL(Py)$_2$]$_n$ electrode at different current densities (0.25C and 0.5C), according to Embodiment 2.
Figure 2E:
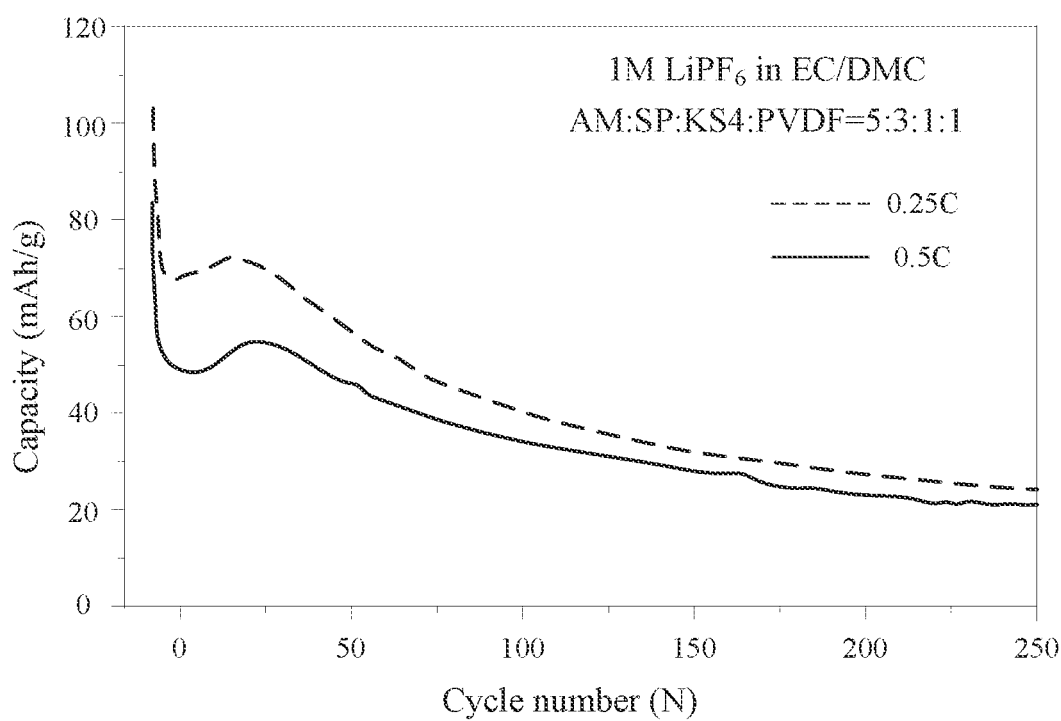
FIG. 2E is an analyzing diagram of capacity retention of a [CuL(Py)$_2$]$_n$ electrode at different current densities (0.25C and 0.5C), according to Embodiment 3.
Figure 2F:
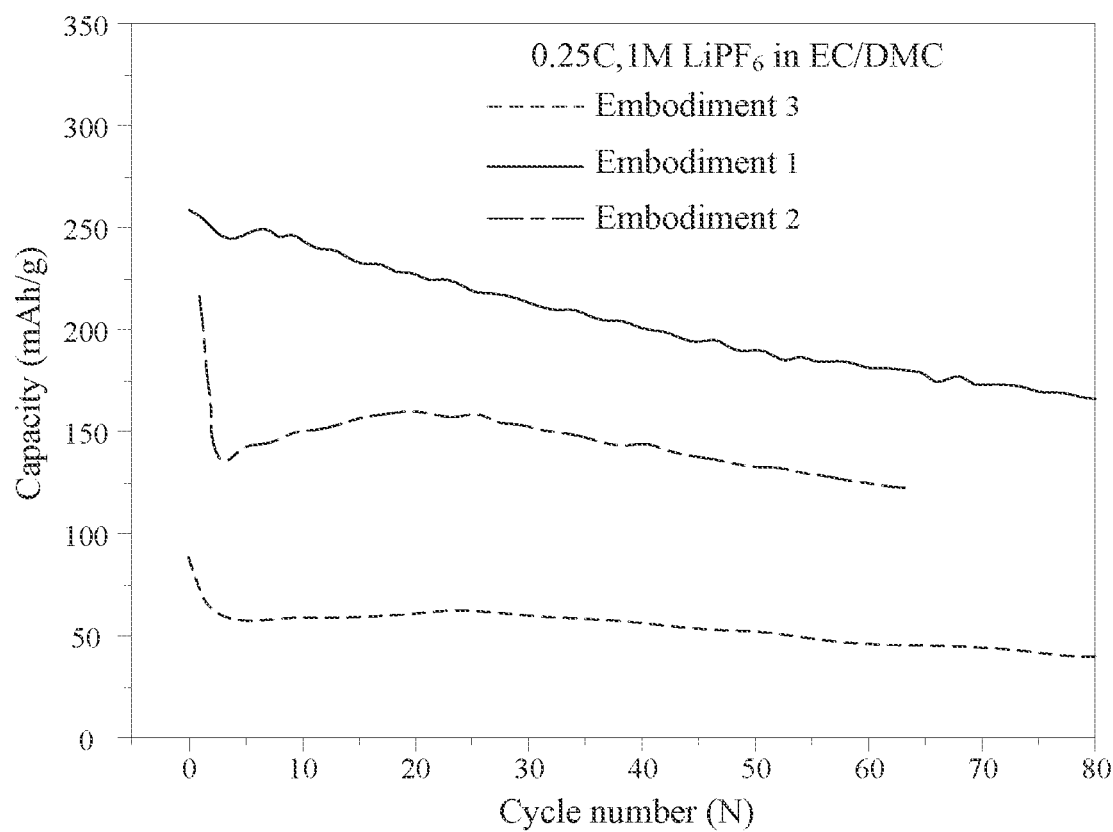
FIG. 2F is an analyzing diagram of capacity retention of a [CuL(Py)$_2$]$_n$ electrode at a current density of 0.25C (about 65 mA/g), according to Embodiments 1-3.
Figure 2G:
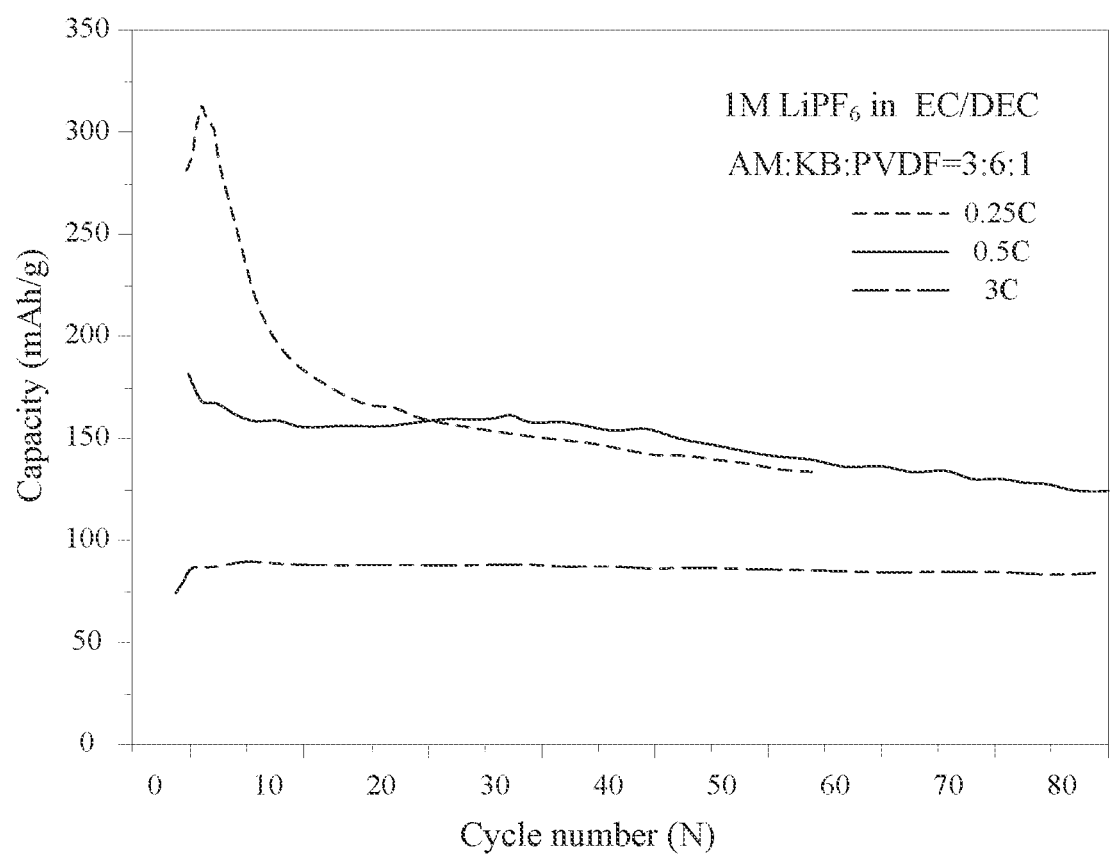
FIG. 2G is an analyzing diagram of capacity retention of a [CuL(Py)$_2$]$_n$ electrode at different current densities (0.25C, 0.5C, and 3C), according to Embodiment 4.
Figure 2H:
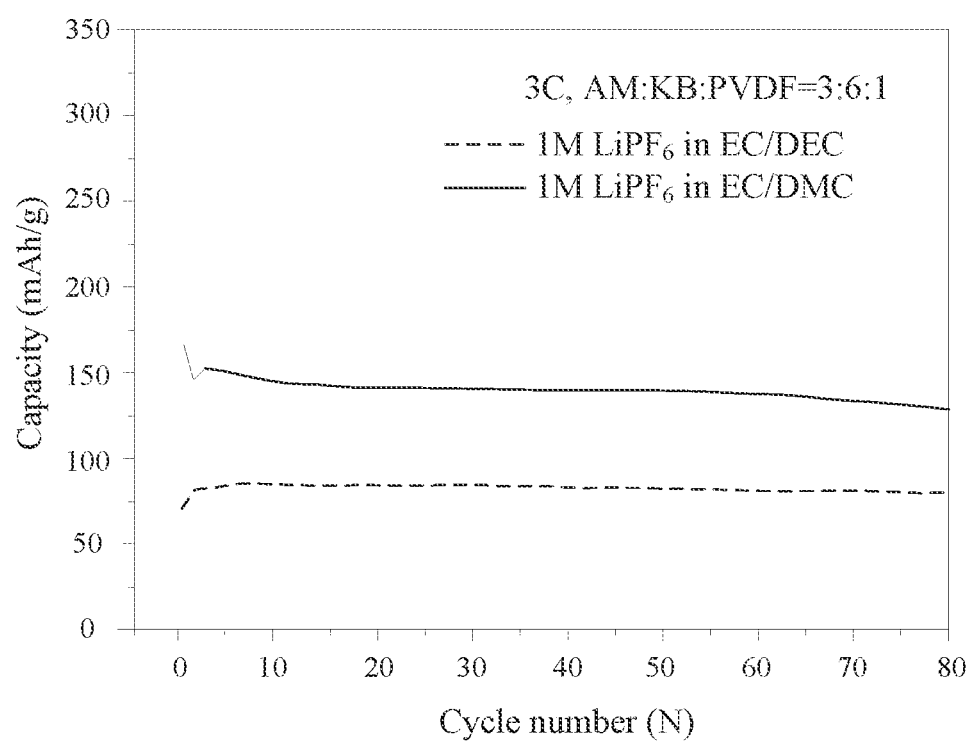
FIG. 2H is an analyzing diagram of capacity retention of a [CuL(Py)$_2$]$_n$ electrode at a current density of 3C (about 780 mA/g), according to Embodiments 1 and 4.

FIG. 2D is an analyzing diagram of capacity retention of a $[CuL(Py)_2]_n$ electrode at different current densities (0.25C and 0.5C), according to Embodiment 2. FIG. 2E is an analyzing diagram of capacity retention of a $[CuL(Py)_2]_n$ electrode at different current densities (0.25C and 0.5C), according to Embodiment 3. FIG. 2F is an analyzing diagram of capacity retention of a $[CuL(Py)_2]_n$ electrode at a current density of 0.25C (about 65 mA/g), according to Embodiments 1-3. FIG. 2G is an analyzing diagram of capacity retention of a $[CuL(Py)_2]_n$ electrode at different current densities (0.25C, 0.5C, and 3C), according to Embodiment 4. FIG. 2H is an analyzing diagram of capacity retention of a $[CuL(Py)_2]_n$ electrode at a current density of 3C (about 780 mA/g), according to Embodiments 1 and 4.

From the above analysis, it can be seen that the cathode formed by using different compositions and ratios under the framework of $[CuL(Py)_2]_n$ can still have certain characteristics of lithium-ion batteries. In Embodiment 2, a capacity at a current density of 65 mA/g can reach about 220 mAh/g. In Embodiment 3, a capacity at a current density of 65 mA/g can reach about 85 mAh/g. In Embodiment 4, a capacity at a current density of 65 mA/g can reach about 280 mAh/g.

The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A cathode material, suitable for a lithium-ion battery, the cathode material comprising following formula (1) of:

(1)

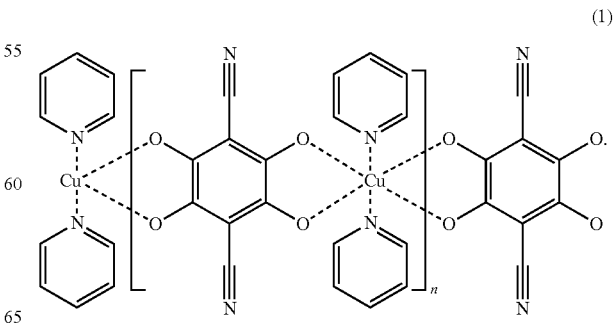

2. A lithium-ion battery, comprising:
a cathode material according to claim 1;
an anode material; and
an electrolyte placed between the cathode material and the anode material.

3. The lithium-ion battery according to claim 2, wherein the anode material comprises at least one of graphite, lithium titanium oxide, and lithium metal.

4. The lithium-ion battery according to claim 2, wherein the electrolyte comprises a lithium salt, wherein the lithium salt comprises at least one of LITFSI, LiFSI, LiPF$_6$, LiClO$_4$, LiBOB, and LiBF$_4$.

5. The lithium-ion battery according to claim 4, wherein the electrolyte further comprises ethylene carbonate (EC) and dimethyl carbonate (DMC), wherein a volume ratio of ethylene carbonate (EC) and dimethyl carbonate (DMC) is between 0.5 and 2.

6. lithium-ion battery according to claim 4, wherein the electrolyte further comprises ethylene carbonate (EC) and diethyl carbonate (DEC), wherein a volume ratio of ethylene carbonate (EC) and diethyl carbonate (DEC) is between 0.5 and 2.

7. A fabricating method of a cathode material, suitable for a lithium-ion battery, the fabricating method comprising steps of:
adding 1,4-dicyano-2,3,5,6-tetrahydroxybenzene and a copper salt in a solvent to form a first solution, wherein a molar ratio of 1,4-dicyano-2,3,5,6-tetrahydroxybenzene and the copper salt is between 0.5 and 2;
adding pyridine to the first solution to form a second solution, and heating the second solution at 95-105° C. for 24 to 72 hours, wherein a volume ratio of pyridine to the solvent is between 0.1 and 2; and
cooling and filtering the second solution to obtain the cathode material, wherein the cathode material includes a structural formula of following formula (1):

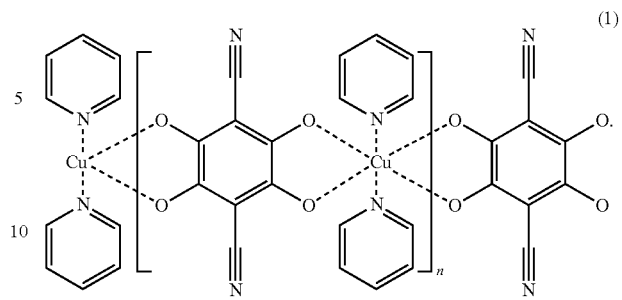

8. The fabricating method of the cathode material according to claim 7, wherein the solvent comprises at least one of N,N-dimethylformamide (DMF), N,N-diethylformamide (DEF), N,N-dimethylacetamide (DMA), dimethyl sulfoxide (DMSO), MeOH, EtOH, isopropanol, and water.

9. The fabricating method of the cathode material according to claim 7, wherein the copper salt comprises at least one of copper nitrate, copper sulfate, copper acetate, copper carbonate, copper phosphate, copper hypochlorite, copper chloride, copper hydroxide, copper fluoride, copper bromide, copper iodide, and hydrates thereof.

10. The fabricating method of the cathode material according to claim 7, wherein after cooling and filtering the second solution to obtain the cathode material, the fabricating method further comprises a step of:
washing the cathode material sequentially with N,N-dimethylformamide and ethyl acetate, and drying the cathode material under vacuum for 2 to 4 hours.

* * * * *